United States Patent
Kopylov et al.

(10) Patent No.: US 11,288,377 B1
(45) Date of Patent: Mar. 29, 2022

(54) VIRTUAL MACHINE-BASED TRUSTED EXECUTION ENVIRONMENT

(71) Applicant: Pavel Izhutov, Los Altos Hills, CA (US)

(72) Inventors: Sergey Kopylov, Tambov (RU); Pavel Izhutov, Los Altos Hills, CA (US)

( * ) Notice: Subject to any disclaimer, the term of this patent is extended or adjusted under 35 U.S.C. 154(b) by 0 days.

(21) Appl. No.: 16/592,188

(22) Filed: Oct. 3, 2019

(51) Int. Cl.
| | |
|---|---|
| *G06F 21/57* | (2013.01) |
| *G06F 21/62* | (2013.01) |
| *G06F 21/60* | (2013.01) |
| *G06F 9/455* | (2018.01) |

(52) U.S. Cl.
CPC ........ *G06F 21/577* (2013.01); *G06F 9/45558* (2013.01); *G06F 21/602* (2013.01); *G06F 21/6245* (2013.01); *G06F 2009/45562* (2013.01); *G06F 2009/45587* (2013.01); *G06F 2221/034* (2013.01)

(58) Field of Classification Search
CPC .. G06F 21/577; G06F 9/45558; G06F 21/602; G06F 21/6245
USPC .......................................................... 726/25
See application file for complete search history.

(56) References Cited

U.S. PATENT DOCUMENTS

| | | | |
|---|---|---|---|
| 8,607,067 B1 * | 12/2013 | Janse van Rensburg | ................... H04L 63/0823 713/189 |
| 9,992,024 B2 * | 6/2018 | Song | ........................ G06F 21/57 |
| 2019/0095350 A1 * | 3/2019 | Durham | ................. G06F 21/602 |

* cited by examiner

*Primary Examiner* — Abiy Getachew
*Assistant Examiner* — Phuc Pham

(57) ABSTRACT

A virtual machine (VM) provisioned in the IaaS platform from a custom OS distribution that implements a remote attestation of itself. The VM can prove its privacy and integrity properties to an external party using a set of OS-level restrictions and IaaS-level validations. Remote attestation provides guarantees that the VM administrator cannot tamper with the VM operation and cannot access sensitive data. The attested properties are guaranteed by the correct operation of the underlying VM technology.

1 Claim, 4 Drawing Sheets

VIRTUAL MACHINE-BASED TRUSTED EXECUTION ENVIRONMENT

BACKGROUND

This relates to building trust in operation of a virtual machine operated by another party.

Before the Internet age, computer users mostly relied on the software installed on their personal machines. The users had full control over installed applications and did not need to trust third parties to manage them. The commoditization of the Internet created the industry of web applications, installed on remote servers and controlled by third parties (application owners). The convenience of such applications attracted billions of users, but made their operation more obscure and less trustworthy. In particular, in some cases a user provides application with sensitive data (e.g., her genome) but lacks assurances of data privacy from the application owner. Furthermore, the result of a computation is often critical to be correct (e.g., a medical diagnosis) but the user cannot verify that the right version of the software application is installed on the server.

This problem is addressed by trusted execution environments (TEE) that provide integrity and confidentiality of processed data. There is a number of technologies implementing TEE, the most relevant for cloud computing being Intel Software Guard Extensions (SGX). It creates secure enclaves in memory and allows third parties to perform remote attestation that ensures that the right code is loaded into the enclave. Despite the availability of SGX technology in many modern processors, it has not received wide adoption yet. Some of the reasons are technological, including restrictive protected memory limits (can be as little as 128 Mb per enclave), the need for a deep expertise in SGX technology and security vulnerabilities towards speculative execution attacks (Meltdown, Spectre, Foreshadow). Another big reason is limited technology availability among cloud service providers. Only IBM Cloud supports it among big market players. Overall, the high cost and complexity of adopting SGX technology makes it prohibitive for widespread adoption. The approach described below overcomes the above limitations while providing robust security guarantees that create trust between users and software application owners.

SUMMARY

A TEE based on a virtual machine is described. The TEE protects the integrity and data from the virtual machine administrator and assumes the underlying cloud provider can be trusted. The TEE provides a remote attestation protocol allowing its users to verify the properties of the application running inside the TEE. The TEE allows the development of privacy preserving cloud applications based on trust to the cloud provider.

Most of the existing research in trusted computing is focused on building privacy and integrity protections from the hardware owner. In case of cloud computing the hardware infrastructure is owned and managed by infrastructure-as-a-service (IaaS) provider. The real lack of trust, however, often emerges at the level of software vendors (application owners), who are not legally required or do not have resources to implement the same level of security for operation of cloud applications. The hereby presented VM-based approach brings privacy and integrity guarantees of software vendors to the level of large IaaS providers. In particular, it leverages IaaS service commitments as the underlying trust layer and ability of IaaS providers to fully monitor manipulations of the vendors with their hardware. Even though the vendors control the virtual machines provisioned by the IaaS provider according to the terms of service, surprisingly, vendors are able to let go of this control and instantly prove to any third party that they can be fully trusted. The trust is maintained by a single IaaS or a network of IaaS providers that reach consensus about the integrity of the vendor computation.

DRAWINGS

DETAILED DESCRIPTION

Traditional approach to creating TEE is hardware-based. It focuses on eliminating the need to trust the hardware owner and places trust in the hardware manufacturer. The hardware-based approach to TEE is complicated and is currently difficult to implement inside the cloud infrastructure services. An alternative implementation of TEE, proposed here, is based on the infrastructure-as-a-service virtual machines (VM). Unlike the hardware approach, where the trust put in a hardware manufacturer, the IaaS VM approach places trust in the IaaS provider but not the VM administrator. One of the main benefits of using the VM-based approach is that existing IaaS customers can easily adopt it. A third party is then able to perform remote attestation of a VM and trust that it operates as claimed, based on the trust in the corresponding IaaS provider. Another advantage of the VM-based TEE is that it allows to implement a flexible remote attestation protocol that can prove various properties of the installed applications. For instance, a zero-knowledge application can prevent the VM administrator from accessing sensitive user data. Or, an API provider can prove that the correct version of data processing library is used by the algorithm. Another advantage is the ability to access all VM resources and capabilities, including large memory, multiple CPU and GPU cores.

The current invention uses a non-trivial combination of features available in modern IaaS platforms and a combination of operating system changes and services to implement a remote attestation of the TEE. While most TEE research is focused on hardware-based approaches, this invention offers a simpler alternative that can be adopted by many existing users of IaaS platforms with limited changes to existing applications.

Figure 1:
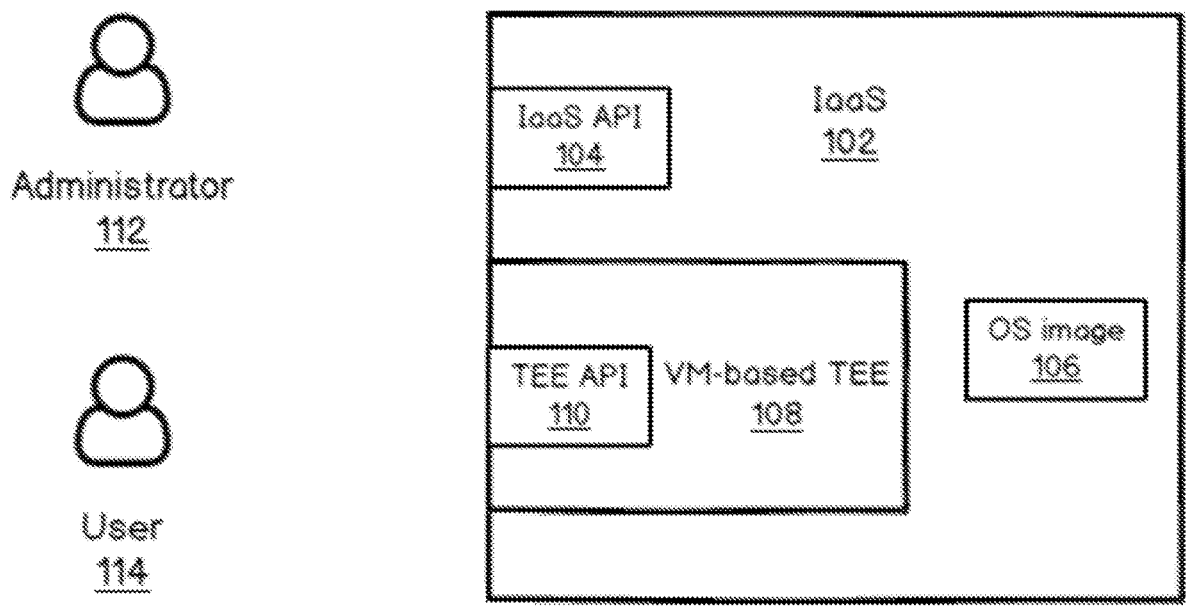
FIG. 1 illustrates the virtual machine-based TEE inside the cloud infrastructure service.

The structure of the system is shown in FIG. 1. The VM representing the TEE 108 is provisioned on the IaaS 102 by the administrator 112 using a specially prepared operating system (OS) image 106. The TEE provides an application programming interface (API) 110 that is used to install an application on the VM, perform remote attestation and send requests to the application.

Figure 2:
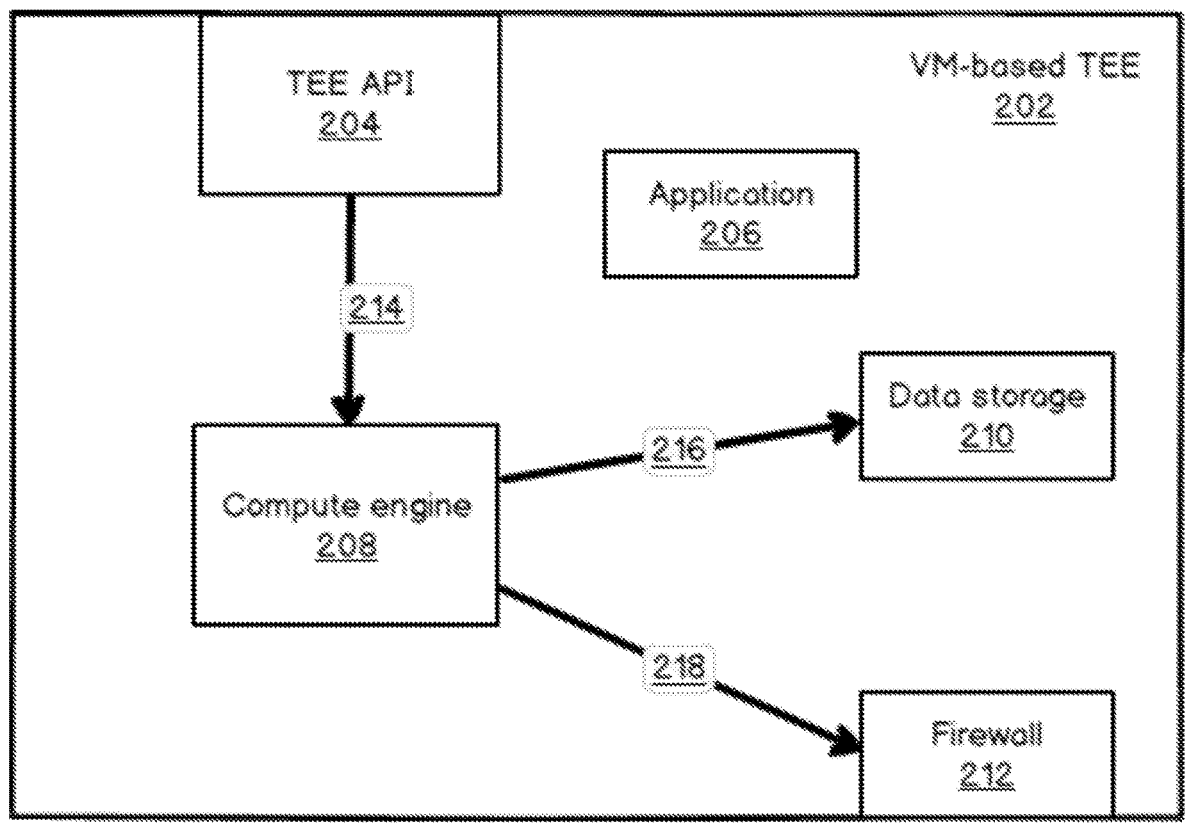
FIG. 2 illustrates the internal structure of the virtual machine-based TEE.

FIG. 2 illustrates the internal structure of the VM-based TEE 202 and the flow of data inside of it. The TEE 202 provides the API 204 that represents the only way to interact with the TEE from the outside. The TEE API 204 uses the Transport Layer Security (TLS) encrypted communication over the TCP protocol (such as HTTP or WebSocket). The corresponding TLS certificate is based on a unique private-public key pair, that is generated during the TEE 202 boot and is not available outside TEE.

The TEE API 204 provides methods for installing the application 206, uploading the IaaS credentials, performing remote attestation and interacting with the application 206. The TEE API 204 method for the application installation authenticates the TEE administrator 112 and installs the application 206 using provided the source code or binaries. The TEE API 204 method for uploading the IaaS credentials, only available to the administrator 112, is used to enable the TEE remote attestation. The TEE API 204 method for the TEE remote attestation is available to any user who may need to interact with the TEE and is described below.

The TEE API 204 method for interacting with the application 206 performs the actual data processing via HTTP, WebSocket or another network protocol. First, the API method maps the incoming request to an application endpoint (if possible). Then the API method performs user authentication. Most common authentication methods can be implemented, including password-based authentication, API keys and OAuth. User authentication may involve validating user credentials against the data storage 210. Finally the request is sent (arrow 214) to compute engine 208 for processing along with the information about the application endpoint, endpoint restriction policy and user. Once the request is processed, the response is sent back to user via the TEE API 204.

The compute engine 208 is responsible for processing user requests in an isolated environment, consistent with the endpoint restriction policies. The execution of the application code is isolated from the host OS using a container technology such as Docker. Each request inside the container is handled by a separate OS process. The process can utilize both CPU and GPU (if available) for computing. In order to guarantee data confidentiality (primarily from the administrator 112), several restrictions are applied to the request handling process.

Many applications running inside TEE 108 will need access to the data storage. Since the TEE 108 operates in the absence of trust to the TEE administrator 112, additional mechanisms are needed to guarantee data privacy and integrity. VM RAM is used as a volatile data storage that preserves data privacy and integrity, since the administrator 112 has no direct access to the VM RAM. If a process requires access to the VM disk for storing temporary data, the RAM disk can be used instead.

There are multiple ways to store application data permanently, which include saving data on the VM disk or external data storage. However, data privacy in respect to the administrator 112 may not be guaranteed without data encryption. For example, the VM 108 disk data can be extracted by the administrator 112 by making a snapshot of the disk, creating a new disk based on the snapshot and attaching this disk to another VM for inspection. Non-sensitive data, such as application logs, that help to identify bugs and runtime errors, may still be written to the VM disk. All sensitive data must be encrypted inside the TEE 108 before being saved to a permanent data storage.

In some applications there is a need for a zero-knowledge data storage 210, that does not allow the administrator 112 to see some parts or any user data. In many respects the data storage 210 is similar to a traditional database with one main difference—sensitive data is encrypted per row, with encryption keys owned by different users and not available to the administrator 112. The data storage query 216 sent from the request handling process to the data storage 210 is annotated with the information about the user 114, an endpoint data storage policy and a user's private key provided during authentication in the TEE API 204. Before processing a query 216 the data storage 210 checks whether the query 216 is compliant with the attached endpoint policy, which may include encrypting the user data and/or enforcing read and write permissions. In some cases the zero-knowledge data storage can be set up inside another VM-based TEE. Before sending queries to such data storage, compute engine performs a remote attestation of the corresponding TEE to ensure that it is compliant with the application 206 privacy requirements.

All network requests 218 initiated by the request handling process must be filtered by the firewall 212. The firewall 212 accepts the network request 218 and identifies the compute engine process that initiated it, which provides information about the user who made the request to the TEE API 204 and endpoint network restriction policy. This data is used by the firewall 210 to decide whether the network request 218 must be blocked. To provide an additional layer of security, TLS encrypted network requests to external services can be verified by checking that correct TLS certificate was used (e.g., by checking the certificate public key). This is important if the TEE administrator 112 has a technical ability to launch a spoofing or other type of a network attack.

Figure 3:
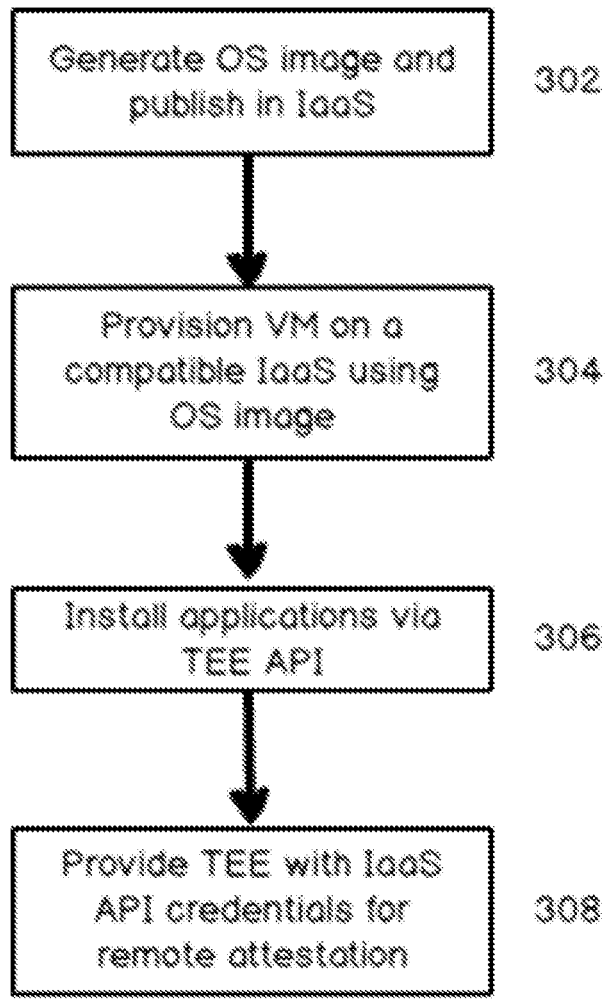
FIG. 3 is a flowchart illustrating the process of creating a virtual machine-based TEE.

FIG. 3 illustrates the process of creating a VM-based TEE 108. In step 302 the OS image 106 used for provisioning the VM 108 is generated and published in the IaaS 102. The OS image 106 is created from a server Linux-based OS, such as Debian. Unlike typical Linux distributions that focuses on providing the administrator with convenient tools for managing the VM, the OS image 106 aims to restrict the VM access for the administrator. The OS image 106 doesn't provide SSH or any other type of the login into OS. Instead, it has a well-defined and limited TEE API 204. The OS boot process implemented in the OS image 106 is adjusted to generate a unique private-public key pair in RAM and print the public key in the VM boot log. The OS image 106 includes a web server powering the TEE API 204, compute engine 208, data storage 210 and firewall service 212, that are started automatically during the OS boot.

The OS image 106 is generated with an open source utility to ensure that anyone can validate the contents of the image. The exact process of the OS image 106 generation depends on the IaaS 102 provider, but generally consists of setting up a VM, creating a second disk and attaching it to the VM, launching a script inside the VM that generates the OS image in the second disk. Then the disk is detached from the VM and a reusable OS image 106 is created, which can later be published on the IaaS image marketplace or shared privately.

In step 304 a VM 108 is provisioned using the OS image 106 by the administrator 112. Once the VM 108 OS boots, the administrator 112 completes the process using the TEE API 110 in steps 306 and 308. To access the TEE API 110, the administrator 112 is authenticated using public key cryptography based on a public key passed to VM 108 during provisioning (step 302). In step 306 the administrator 112 installs an application on the VM 108. The application can be provided in multiple formats: source code, binary or one of pre-defined options and can be either uploaded or referenced via the universal resource locators (URL). After installation is complete VM 108 is sealed, ensuring that its behavior cannot change in the future. In step 308 administrator 112 prepares IaaS API credentials with read-only permissions for accessing information about VM 108 and uploads them via TEE API 110 for later use during the remote attestation process. Once the step 308 is completed, the VM-based TEE 108 can be verified via remote attestation and earn trust in the way it operates, backed by the trust in the correct functioning and security of the IaaS 102.

Figure 4:
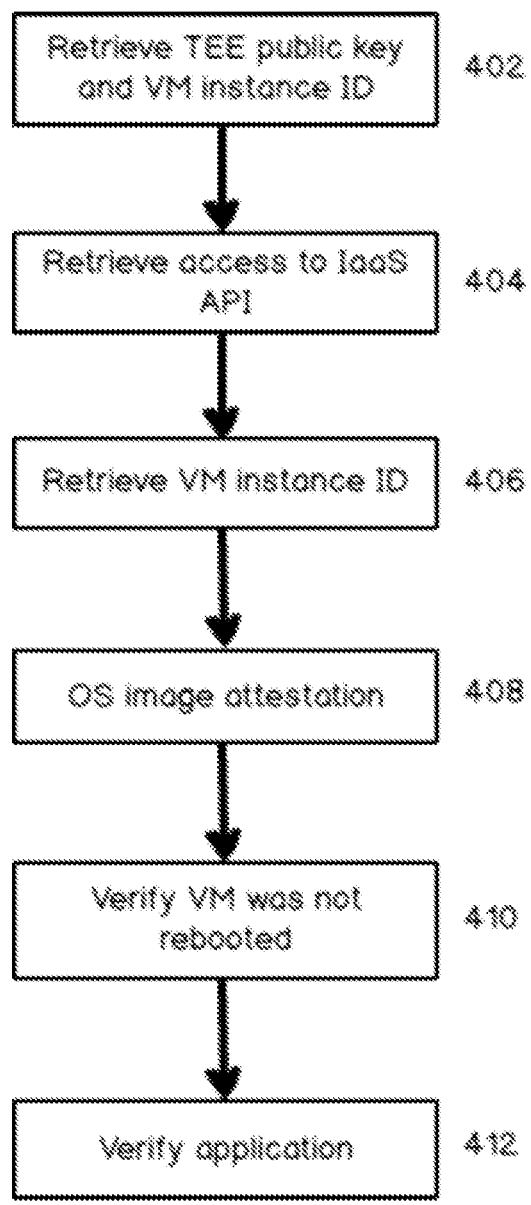
FIG. 4 is a flowchart illustrating the remote attestation process of a virtual machine.

The remote attestation of the VM-based TEE is an interactive process initiated by the user shown in FIG. 4. It proves to the user that the application installed inside the TEE has certain properties, which are communicated by the remote attestation protocol. The trust in compliance with claimed application properties is based on trust in the open source implementation of the VM-based TEE technology and the correct operation of the IaaS VM-related functionality.

TEE remote attestation process is a sequence of TLS-encrypted HTTP requests to the TEE API 110 and IaaS API 104. On the first HTTP request (step 402) the user 114 obtains a unique IaaS identificator (ID) of the VM 108. In addition, the user 114 retrieves a TLS certificate that contains a public key that matches the encryption key pair generated during the VM 108 boot. It is important that all future network requests to the TEE API 110 are encrypted with the same TLS certificate to avoid TEE impersonation.

In the step 404 the user 114 retrieves access to the IaaS API 104 for querying the VM information and verifies that the VM is correctly provisioned. In some cases, the TEE API 110 will return raw IaaS API credentials with limited permissions, such as read-only access to VM information. However, sharing these credentials can increase security risks, lead to IaaS API rate limits abuse or expose unnecessary sensitive information. Alternatively, TLS Notary technology can be used to provide user with the IaaS API responses without sharing credentials. TLS Notary allows one user (auditor) to participate in a TLS encrypted communication between another user (auditee) and a website in a way, that reveals the contents of the HTTP response to the auditor without revealing authentication information that can be user to impersonate the auditee. In some implementations, the step 404 will be skipped, all HTTP requests to the IaaS API 104 will be performed by the VM 108 and audited by the user 114 using the TLS Notary.

In the step 406 the user 114 performs an HTTP request to the IaaS API 104 to retrieve the OS boot log information for the VM with the ID obtained in the step 402. The OS boot log contains the public key generated during the VM 108 provisioning (step 304). The user ensures that the public key obtained in the step 402 is the same as the public key extracted from the OS boot log.

In step 408 the user 114 performs an HTTP request to the IaaS API 104 to retrieve the OS image 106 ID used to provision the VM 108. Typically the user 114 matches this OS image ID against the list of the OS images verified earlier, by the user herself or a trusted third party. In some cases the user 114 will perform the OS image verification, which can be done by setting up a new VM in the same IaaS. First, a disk created from a published OS image is attached to this VM. Another disk, empty at first, is attached to the VM and the open source utility used to generate the OS image 106 is executed. The contents of both disks are then compared, and the image is considered verified on the exact match.

For most services the IaaS API provides the OS image ID that was used to provision VM, but does not indicate whether the VM was ever stopped. Once the VM is stopped the boot disk can be replaced with a disk based on another OS image and the VM can be started again without any reflection in the VM information returned by the IaaS API.

The step 410 detects such a manipulation by requesting the IaaS activity log via the IaaS API 104. All supported IaaS providers let user to request the log of all actions changing the infrastructure, including a stop or reboot of the VM. Steps 402, 404, 406, 408 and 410 assure the user that the VM-based TEE 108 was created correctly.

In the step 412 the user 114 uses the TEE API 110 to perform the attestation of the installed application properties. Attested properties differ from application to application. Some of them enforce the privacy of user data and enable the development of zero-knowledge applications in which administrator can not access user data. In other cases the operation of the whole application or its part must be revealed to provide transparency in operation. This can be done by revealing the corresponding source code.

The feasibility of the remote attestation process and the described implementation of the IaaS-based TEE places certain requirements on the underlying IaaS platform. The IaaS must allow sharing an immutable OS image labeled with a unique ID. The IaaS must allow provisioning a VM, based on a given OS image and assign a unique VM ID. The IaaS API must allow to retrieve information about the VM using its ID, particularly the ID of the OS image used to provision the VM and VM OS boot log. The IaaS must provide no way to access the VM RAM by any means other than running an application inside the VM OS. The IaaS API must provide the full infrastructure activity log related to VM. The IaaS must provide a way to attach a non-boot disk to a running VM. The IaaS must allow to provide metadata that is passed to the VM on provisioning. Currently there are 6 IaaS services provided by large cloud vendors that satisfy the above requirements: Amazon Web Services, Microsoft Azure, Google Cloud Platform, Oracle Cloud, IBM Cloud, and Alibaba Cloud.

The invention claimed is:

1. A method for protecting user data from an untrusted administrator who manages an untrusted application in a trusted public cloud infrastructure using a zero-knowledge runtime inside a virtual machine in a publicly verifiable way, comprising:
    preparing an operating system distribution, comprising:
        restrictions on any network access to the kernel or processes with the exception of a network interface that allows:
            to initiate the state of the virtual machine using said operating system distribution, comprising:
                installing one or several software applications;
                providing configuration, credentials for accessing various systems or other data required for said virtual machine operation;
            to process incoming requests using said untrusted application in a container runtime environment, that isolates the request handling process from said operating system and prevents data leaks;
        firewall filtering all network requests to ensure all data in transit is encrypted with keys unavailable to said virtual machine administrator;
        zero-knowledge data storage that encrypts all data at rest with user-owned keys unavailable to said virtual machine administrator;
    provisioning a virtual machine using said operating system distribution on a trusted infrastructure-as-a-service platform, which:
        allows sharing immutable operating system images;
        provides no direct access to the virtual machine random access memory outside the operating system;
        assigns the virtual machine with a unique identifier;

retrieving information describing the virtual machine state, including the operating system image used during the provisioning;

allows bi-directional data communication between the virtual machine and infrastructure-as-a-service platform during the virtual machine boot;

provides information on the infrastructure-as-a-service platform activity related to the virtual machine, including stopping and rebooting said virtual machine;

initiating the state of said virtual machine by installing applications and/or providing configuration information;

performing remote attestation of said virtual machine by said other party to ensure user data is protected, by one of the methods:

direct remote attestation, comprising:

retrieving a virtual machine unique identifier on the infrastructure-as-a-service platform;

retrieving access to the infrastructure-as-a-service information related to said virtual machine, including the boot log and the operating system image identifier, by one of the methods:

sharing infrastructure-as-a-service credentials; or using an interactive cryptographic audit method to prove the integrity of the virtual machine information retrieved from the infrastructure-as-a-service provider;

retrieving the infrastructure-as-a-service platform information describing how said virtual machine was provisioned and operated;

delegated remote attestation, in which a trusted third party provides the complete or partial results of direct remote attestation.

* * * * *